Oct. 18, 1966
W. WHITTUM
3,279,109
REGISTRATION DEVICE FOR OVERHEAD PROJECTOR SLIDES
Filed Dec. 2, 1963
2 Sheets-Sheet 1
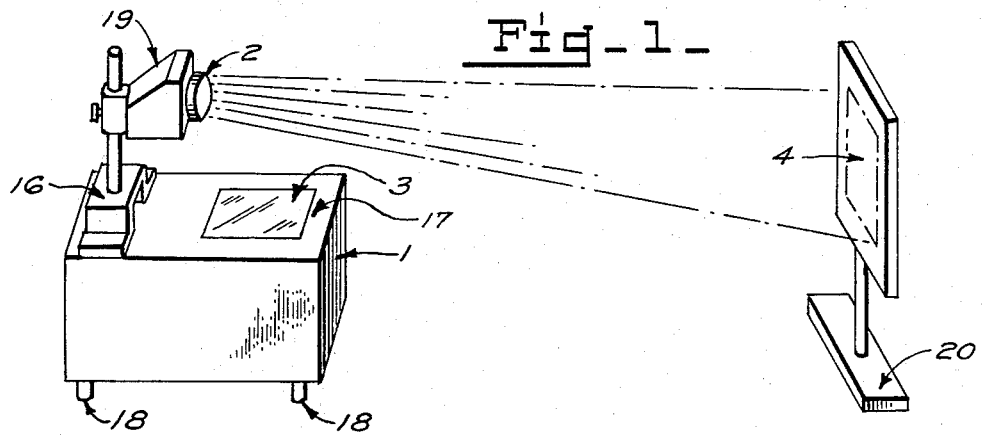
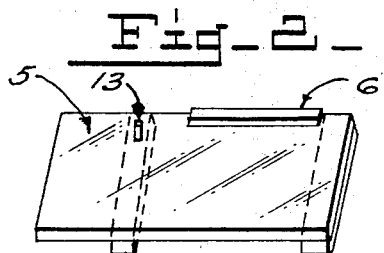
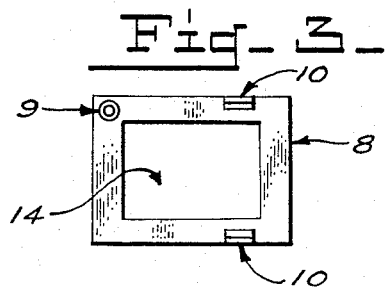
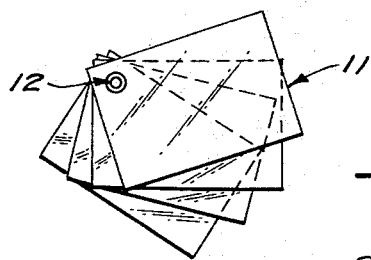
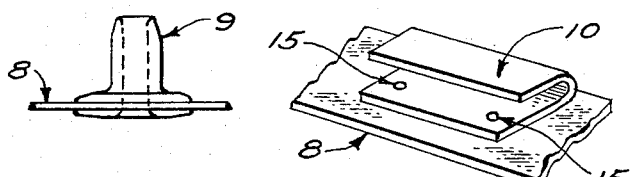
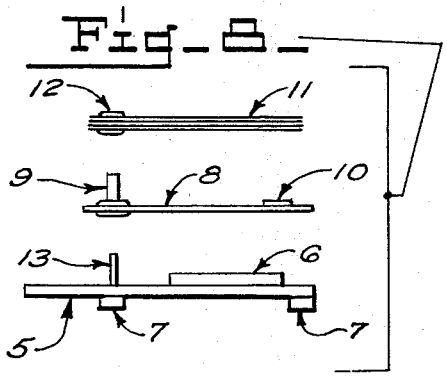
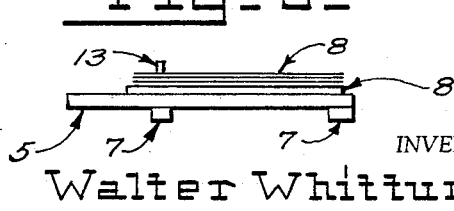
INVENTOR
Walter Whittum
BY L.S. Michelman
ATTORNEY Oct. 18, 1966 W. WHITTUM 3,279,109
REGISTRATION DEVICE FOR OVERHEAD PROJECTOR SLIDES
Filed Dec. 2, 1963 2 Sheets-Sheet 2
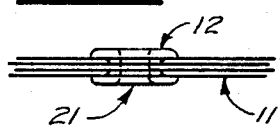
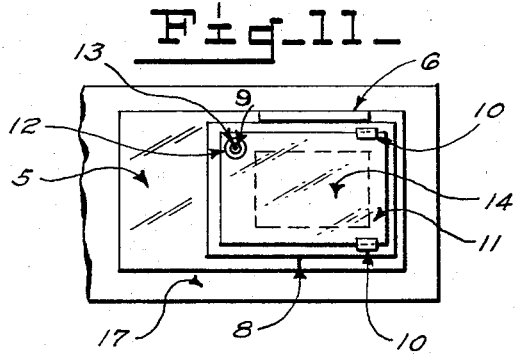
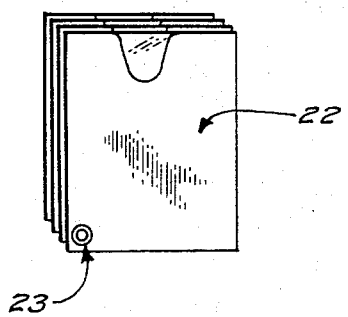
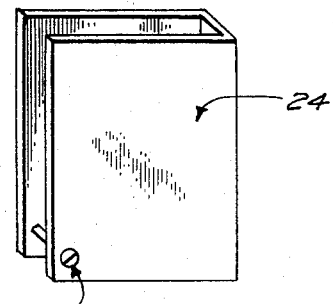
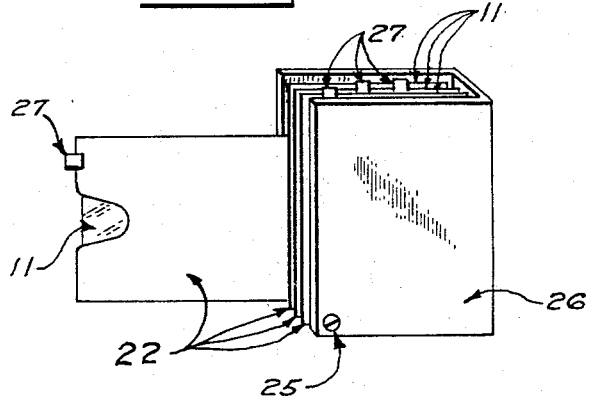
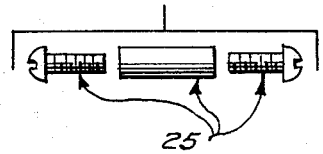
INVENTOR
Walter Whittum
BY
ATTORNEY United States Patent Office 3,279,109
Patented Oct. 18, 1966

3,279,109
REGISTRATION DEVICE FOR OVERHEAD PROJECTOR SLIDES
Walter Whittum, 191 Chestnut St., Longmeadow, Mass.
Filed Dec. 2, 1963, Ser. No. 327,239
7 Claims. (Cl. 40—106.1)

This invention is concerned with a registration device for overhead projector slides.

There is in common use today for projection of images on a screen at a distance from the light source the type of a light projector device which transmits the image upwardly into a reflector and which is then reflected upon a screen at some distance from the device.

One of the better known techniques of obtaining quality projection of combined images is to superimpose various prints, one over the other.

This invention is concerned essentially with a method for aligning the prints which are to be used in this type of projector so that they may at all times be in perfect complement and so that at all times they may be stored properly, for subsequent use.

It is the purpose of the within invention to provide a means for controlling the proper alignment and location of a plurality of prints that are to be employed with a projection screen.

It is yet another object of the within invention to provide a means for registering a plurality of prints that are to be employed with a projection screen of the overhead projector type.

It is still a further object of the within device to provide a means for storing complementary sets of prints that are to be registered with a screen of the projection type.

It is a principal object of the within invention to provide a device wherein prints may be projected in any sequence, any grouping or on any multiples.

It is yet an additional object of the within invention to provide a means for permitting various multiples of prints to be registered at the same or different times above the light source with an overhead projection type of screen.

These and other objects are obtained by the use of an eyelet or open grommet which movably secures the various prints together. There is located upon the bed of the overhead projector a means for receiving the eyelets on a registration post. The eyelet which circumscribes the post permits the eyelet to be moved about the vertical axis of the registration pin which is inside the post mounted on a special base.

For a more comprehensive explanation of the within invention, reference is made to the following detailed description, in which:

FIGURE 1 is a perspective view showing a typical overhead projector is operation.

FIGURE 2 is a perspective view showing the transparent base.

FIGURE 3 is a top elevational view of the mask base or frame.

FIGURE 4 is a perspective view of a set of prints grommeted together by an eyelet.

FIGURE 5 is a partial side elevational view of the FIGURE 4.

FIGURE 6 is a side elevational view of the post.

FIGURE 7 is a perspective view of the register stop secured to the mask shown in FIGURE 3.

FIGURE 8 is an exploded side elevational view of the transparent base with the mask frame and the grommeted prints.

FIGURE 9 is a view of FIGURE 8 assembled.

FIGURE 10 is an exploded side elevational view of the eyelet securing the prints.

FIGURE 11 is a top elevational view of the assembly of FIGURE 9.

FIGURE 12 is a perspective view of a jacket holder for the prints.

FIGURE 13 is a perspective view of a hard-bound cover which houses a plurality of the jacket holder of FIGURE 12.

FIGURE 14 is a perspective view of the hard cover of FIGURE 13 housing a plurality of jacket holders.

FIGURE 15 is a side elevational view of a screw assembly which locks the hard cover with the jacket covers as shown in FIGURE 14.

A typical overhead projector is shown in the view of FIGURE 1. The projector 1 has the overhead lens 2. The lens 2 is contained within the head housing 19. The head housing 19 is mounted on a support which is contained within the stand 16. The main portion of the projector has legs 18 and also has a top surface 17. On the top surface 17 is a transparent plate 3.

The conventional screen 4 is mounted at the proper distance from the projector 1 on a base or stand 20. On top of the plate 3 is mounted the transparent base 5. Base 5 has legs 7 as shown in the various views of the drawing, particularly FIGURE 2 and FIGURES 8 and 9. Legs 7 in this embodiment are magnetically secured to the surface 17. Base 5 is made of a plastic material that permits the passage of light. Mounted on top of the plastic base 5 is a guard stop 6, also seen in the view of FIGURE 8. Mounted vertically on the base 5 is the narrow elongated registration pin 13. A mask base or frame 8 is shown in the view of FIGURE 3. The frame 8 forms a perimeter about the plate 3. Frame 8 is also shown in the side elevation of FIGURES 8 and 9. Mounted on the rectangular mask 8 on opposite sides thereof are the registration stops 10. The mask 8 has, of course, the open area as designated by the numeral 14 to permit the passage of the light from the plate 3.

Upon one corner of the mask 8 is the hollow post 9 which fits over the registration pin 13. This can be seen in more detail both in the views of FIGURE 3 and FIGURE 8.

The prints 11 are shown in the view of FIGURE 4. Each separate print is of the same predetermined dimension. The transparent set of prints 11 are grommeted together by the eyelet 12 which has a central opening. They are able to be moved rotatably about the center axis of the eyelet.

FIGURE 6 discloses the detail of the structure of the post 9. The dotted lines indicate that inside of the post 9 it is hollow which permits post 9 to fit over and about the pin 13.

The stops 10 are U-shaped (see FIGURE 7) and are mounted onto the mask 8 by conventional fastening devices such as rivets or screws 15. The shape of the stop 10 permits the prints 11 to engage therein without being torn or mutilated and maintains them stationary in proper alignment.

The eyelet 12 has an open area 21 (FIGURE 10). The eyelet 12 secures the screens together by its outer flange, upper and lower. The eyelet 12 itself is a known expedient and will not be further explained.

In operation the view of FIGURE 11 may best explain the function of the device along with the views of FIGURES 8 and 9.

The plastic base 5 which is transparent is placed as shown over the transparent plate 3 on the top surface 17 of the projector. The mask assembly 8 of FIGURE 3 is then set over the base 5 as shown forming a perimeter about the plate 3. The guard 6 maintains the mask 8 in proper alignment about the perimeter of plate 3. The post 9 fits over and about the pin 13 as shown in the views of FIGURES 6 and 11. The sets of slides or often called transparencies or prints 11 are then placed in position over the post 9 through the center of the eyelet 12 which is concentrically open as at 21 in FIGURE 10. The prints 11 are moveable about the vertical axis of the eyelet 12 within the confines of the stop 10. Because the prints are made of a flexible material they may, of course, be bowed over the stop 10.

Once the projector is energized and the prints 11 are in place, as shown, any one of the prints may be maintained in position over the light source while the others may be rotated outwardly from the light source on the axis of the eyelet 12 so that they will not be in the path of the light source and so that they will not be projected on the screen.

Many times it is desirable or necessary to superimpose one print upon the other. The person operating the screen may be demonstrating various advertising media or giving a talk on some educational subject or the like. Once that phase of the slide has been shown and discussed it is simple to superimpose the second or even the third slide of the unit since they remain pinned together on the eyelet 12 by merely rotating each back into position over area 14.

The salient feature then of this device is that the prints may be projected in any order or sequence, or repeated in any order or grouping.

There is shown in the drawings the jacket holder 22 which have eyeleted openings 23. The slides are placed into these jacket holders. When the jackets are filled, they may be permanently kept in the storage hard-bound cover 24. The storage hard-bound cover 24 is seen clearly in the view of FIGURE 13 and has a screw assembly 25 which may be opened at either end so that the shank of the screw may be inserted within the opening 23 are then passed through the outside of cover 24 for locking engagement. All of the jackets 22 may be tabbed and indexed on the tabs 27. They can be removed from their containers by rotating them down on the axis of the screw assembly 25 as shown in FIGURE 14 and then removed from their jacket for use as before described.

The spirit of the within invention has been disclosed in the foregoing specification and it is contemplated that certain mechanical equivalents may be substituted for those disclosed without departing from the scope of the invention.

In consideration of the foregoing I claim the following:

1. A registration device having a transparent base, leg means for supporting said base on the surface of an overhead projector above the light source, a pin mounted on said base away from the path of the light source, guard stop means on said base for aligning a mask, a flat mask having hollow post, said hollow post covering said pin and said mask being in surface contact with said base, registration stop means on said mask for aligning viewable prints, a pluraltiy of grommeted prints of predetermined dimension having an open eyelet circumscribing said post, said lower print being in surface contact with the upper surface of said mask, all of said prints having their same edges in contact with said registration stop means when in operable position for viewing.

2. A registration device as described in claim 1 wherein said leg means are magnetized for securing said base to the overhead projector.

3. A registration device as described in claim 1 wherein said pin is vertically mounted on said base.

4. A registration device as described in claim 2 wherein said pin is vertically mounted on said base.

5. A registration device as described in claim 1 wherein said registration stop means is U-shaped with its open face directed inwardly towards the prints.

6. A registration device as described in claim 2 wherein said registration stop means is U-shaped with its open face directed inwardly towards the prints.

7. A registration device as described in claim 3 wherein said registration stop means is U-shaped with its open face directed inwardly towards the prints.

References Cited by the Examiner

UNITED STATES PATENTS

| 475,937 | 5/1892 | Ethridge | 40—67 X |
| 2,268,095 | 12/1941 | Tiebel | 40—67 |
| 2,370,305 | 2/1945 | Guditz | 35—40 X |
| 2,478,981 | 8/1949 | Randall | 35—44 |
| 2,527,765 | 10/1950 | Roehrl | 40—159 |

FOREIGN PATENTS

| 461,946 | 2/1937 | Great Britain. |
| 531,094 | 12/1940 | Great Britain. |

EUGENE R. CAPOZIO, *Primary Examiner.*

HERBERT F. ROSS, *Examiner.*